Figure 1:
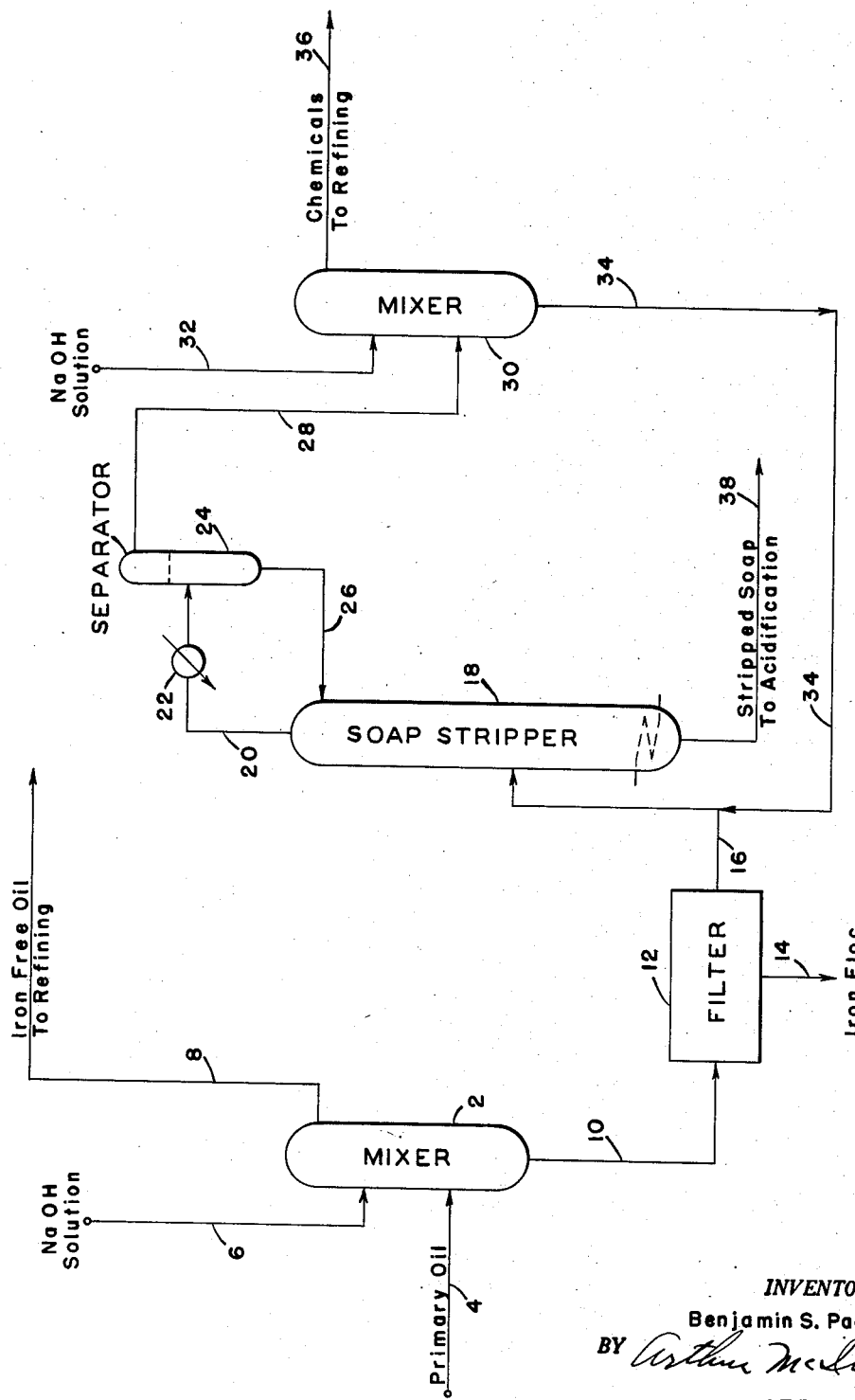

INVENTOR.
Benjamin S. Pace
BY Arthur McElroy
ATTORNEY

INVENTOR.
Benjamin S. Pace

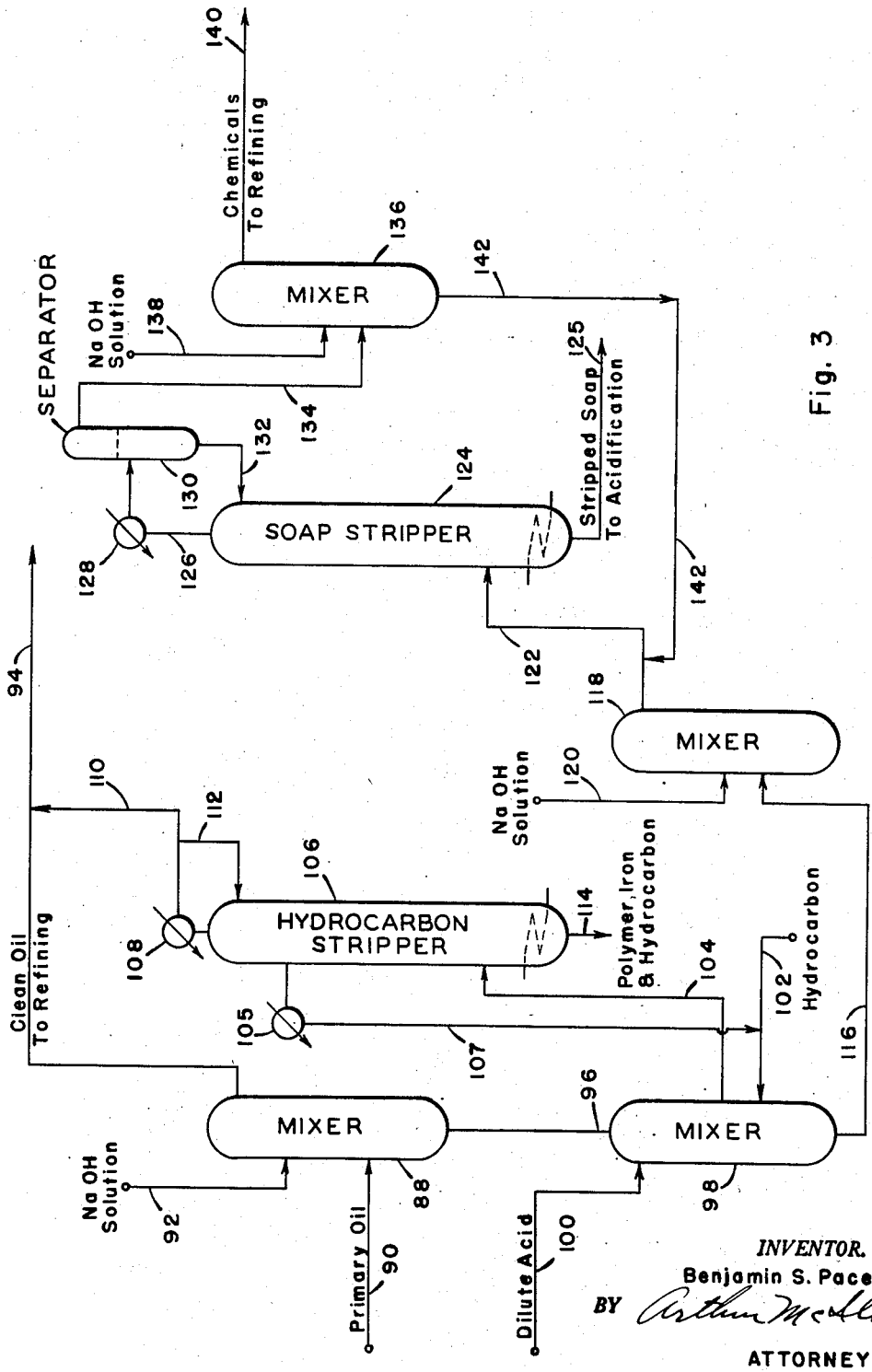

Patented Nov. 10, 1953

2,658,906

UNITED STATES PATENT OFFICE 2,658,906

REMOVAL OF IRON CONTAMINANTS FROM HYDROCARBON SYNTHESIS PRODUCTS

Benjamin S. Pace, Tulsa, Okla., assignor to Stanolind Oil and Gas Company, Tulsa, Okla., a corporation of Delaware Application July 29, 1949, Serial No. 107,544

5 Claims. (Cl. 260—419)

The invention relates to an improved process for refining a hydrocarbon containing dissolved organic chemicals comprising acids and also containing dissolved or occluded metal contaminants such as iron or iron compounds, the basic derivatives of which are substantially insoluble in said hydrocarbon. It pertains more particularly to an improved method and means for effecting separation of organic acids, elimination of precipitatable contaminants and the removal from treated material of substances which would be deleterious to catalysts subsequently employed in refining processes.

The contaminated hydrocarbon-organic chemical mixture may be a product produced by oxidation of hydrocarbons or other carbonaceous material, or it may be a contaminated hydrocarbon solution of organic acids from any other source, but the invention is particularly applicable to the so-called primary oil stream which is separated from the mixture of products produced by synthesis when carbon monoxide and hydrogen are reacted with a promoted iron catalyst at pressures in the range of about 150 to 500 p. s. i. g. and temperatures in the range of 550° to 700° F. The oil stream resulting from such a process contains large amounts, which may range from about 10 to 30 per cent of organic chemicals such as acids, alcohols, ketones, aldehydes, esters, etc. The acid component present in the oil stream in general has the following composition:

| Acid | Vol. Percent |
|---|---|
| Propionic | 0.8 |
| Butanoic | 6.1 |
| Pentanoic | 16.5 |
| Hexanoic | 17.6 |
| Heptanoic | 18.5 |
| Octanoic | 11.7 |
| Nonanoic and higher | 28.8 |

The primary oil also contains dissolved or occluded metal contaminants such as iron or iron compounds which may be present in amounts from about 0.01 to 2.0 weight per cent, based on the weight of primary oil. An object of the invention is to provide improved methods and means for separating said contaminants so that they will not interfere with subsequent chemicals purification or subsequent conversion of hydrocarbon-chemicals mixtures into high quality motor fuels and/or distillate fuels.

This last-named conversion is usually effected by contacting a vaporized hydrocarbon-organic compound mixture with an alumina catalyst such as activated alumina gel, bauxite, synthetic silica-alumina catalysts and the like, at a temperature in the range of about 700° to 900° F. and a pressure from about atmospheric to 50 p. s. i. with a contact time sufficient to effect deoxidation of chemicals and isomerization of the original and produced olefins. Contaminants of the oil stream produced in the synthesis step have been found to deleteriously affect the alumina catalyst in the subsequent conversion step and an important object of my invention is to provide improved methods and means for removing said contaminants from streams which are to be contacted with such catalyst.

Moreover, with hydrocarbon solutions containing aldehydes, the latter tend to polymerize during the deoxidation step to tarry intractable resins in the presence of impurities such as iron; a condition which obviously must be prevented. Likewise, if it is desired to separate the chemicals from the primary oil, the presence of iron is to be carefully avoided in the subsequently recovered mixture of chemicals since on heating the latter to effect a separation of the chemicals into their respective classes, the aldehydes tend to polymerize in the presence of iron thus substantially completely destroying this otherwise recoverable component, as well as rendering more difficult the recovery and purification of the remaining classes of chemicals present in the mixture being treated.

Accordingly, it is an object of my invention to provide a simple and effective means for removing objectionable impurities from oils of the type contemplated herein prior to subjecting them to further refining operations. A still further object of the invention is to provide an improved process for effecting chemicals separation and concentration whereby total synthesis products may be utilized to the maximum extent and handled with a minimum expense. It is an additional object of my invention to purify an acidic oil contaminated with a metal which is in at least a partially dissolved state, the basic derivatives of said metal being substantially insoluble in such oil, by contacting the latter with a suitable base to form a salt of the acid component in said oil whereby the resulting mixture stratifies into an oil phase and a salt component-containing phase and whereby all of the metal contaminant is forced into one of said phases, and thereafter separating the metal contaminant-free phase.

While the description which follows is directed principally to the application of the process of my invention to the removal of iron from hydrocarbon synthesis primary oil, it will be readily apparent to those skilled in the art that my invention is equally applicable to the removal of inorganic impurities other than iron, i. e., impurities that form insoluble basic derivatives in the solution being processed, from primary oil streams, as well as being applicable to the removal of iron or similar impurities from oil streams other than the aforesaid primary oil. Thus, for example, oil fractions, containing no chemicals of the above-mentioned type, may be treated in accordance with my invention to remove iron or similar impurities therefrom prior to introduction of such fraction into the isomerization unit.

I have now discovered that iron or similar impurities may be removed from an acidified oil by increasing the pH of the oil to a level sufficiently high whereby a two phase system is formed, i. e., an oil layer and an aqueous salt layer. By proper regulation of the pH, all of the iron present can be forced to remain in the oil phase or to pass into the salt phase, whichever is desired. In this way either phase may be readily isolated in an iron-free state. The process of my invention is particularly applicable to the removal of dissolved iron from raw hydrocarbon synthesis primary oil and may be carried out in accordance with at least three different methods, the first of which involves the addition of an aqueous caustic solution or other suitable base to the raw primary oil to yield a mixture having a pH of at least about 10 and thereafter allowing the neutralized mixture to stratify into an oil and an aqueous phase. Under these conditions all of the organic acids present are neutralized, the contaminating iron passes into the salt or soap phase and the iron-free oil layer thus obtained may be withdrawn and further refined. The soap fraction which contains iron in the form of a flocculent precipitate of ferric hydroxide may then be filtered, employing a suitable filter aid, such as, for example, one of the diatomaceous earth type, whereby the precipitate of ferric hydroxide is removed from the soap to yield a clear neutral soap filtrate. This filtrate, which may contain the major portion of the chemicals present in the original primary oil, is then subjected to steam distillation or similar treatment, whereby the chemicals are removed overhead and the stripped soap solution removed as a bottoms fraction. The latter is then treated with a suitable acid to liberate the fatty acids which may thereafter be separately recovered by careful fractional distillation. The overhead chemicals fraction may be sent to a suitable chemical recovery system or to an isoformer where the chemicals are converted into high quality gasoline.

The second modification of my process involves first incompletely neutralizing the primary oil with caustic to give an oil and a soap layer. With free acid remaining in the oil phase, the iron is retained by the oil leaving a layer of iron-free soap. Sufficient base is preferably added so that the soap layer thus obtained represents the major portion of acids present in the original oil. This layer may be withdrawn from the mixture and processed to obtain the free acids in substantially pure form in accordance with the procedure generally outlined above. The incompletely neutralized oil layer may thereafter be contacted with a caustic solution sufficiently strong to completely neutralize the remaining acids and cause the iron to precipitate as ferric hydroxide in the soap phase formed by the second neutralization thereby producing a neutral iron-free oil which may be sent to the isoformer as previously described.

The resulting soap phase being small in quantity can be filtered and used in the first neutralization step with or without the addition of water or caustic.

While the foregoing procedures are generally quite satisfactory in the purification of oil solutions of the type contemplated by my invention, they possess certain disadvantages when applied to oils containing aldehydes. Thus, with raw primary synthetic hydrocarbon oils having an appreciable concentration of aldehydes, the addition of caustic in the neutralization step results in the substantially complete conversion of the aldehydes to acid revertable polymers, i. e., polymers which when treated with acid generate the original aldehyde. Such polymers, if allowed to remain in the soap phase in which they are soluble, give rise to considerable difficulty in the subsequent purification of the liberated fatty acids by distillation. Although some of the dissolved polymers present in the crude fatty acid mixture tend to revert to their corresponding aldehydes on distillation of said mixture, a substantial proportion of these polymers resinify to form an intractable coating on the interior of the distillation column thus necessitating periodic removal of the resulting tar before further purification of the fatty acids can be resumed. The acid fractions obtained in this manner, owing to the aldehydes present therein, are still unsatisfactory because of their tendency to darken rather rapidly on storage.

The third embodiment of my invention is especially designed to avoid the foregoing difficulties and involves first adjusting the soap phase obtained from complete neutralization of the raw oil to a pH not in excess of about 7 and thereafter extracting the resulting mixture with a suitable solvent for the dissolved iron and polymers. The resulting extract is thereafter stripped, the clean solvent recycled to the extractor, the polymers, iron, and some hydrocarbon removed in the form of a heavy residue, and the soap phase, which is aldehyde-free but which contains some chemicals, is sent to a stripping column where separation of the chemicals in the soap is effected. During the initial neutralization step a portion of the raw oil dissolves in the soap phase. The portion of the raw oil thus solubilized is removed from the soap and other chemicals by the extraction step and is removed from the resulting extract and returned to the clean oil as an overhead fraction from the solvent stripping column. The quantity of raw oil carried over with the neutral soap phase in the manner described above varies with the concentration of the soap solution formed in the first neutralization step. Accordingly, in the initial neutralization of the oil, I generally do not desire to exceed a soap concentration of about 40 weight per cent. Ordinarily the neutralization step, in this as well as other embodiments of my invention, is preferably effected in a manner such that the concentration of soap in the completely neutralized oil ranges from about 20 to about 40 weight per cent. With soap concentrations in these levels a major proportion of the oxygenated organic compounds is extracted from the raw oil together with only a minor amount of contaminating hydrocarbons.

As examples of solvents which may be employed in carrying out this phase of my invention, there may be mentioned the aromatic and paraffinic hydrocarbons such as, for example, benzene, toluene, heptane, octane, and the like. The solvent preferable for a given soap solution is largely dependent upon the nature of the hydrocarbon component present in the soap phase as an impurity, the concentration of contaminating hydrocarbon and the boiling point of such component being in turn dependent upon the strength of the soap solution in contact with the neutralized synthesis oil. Also, in this connection, it is generally preferable to employ a solvent boiling 10 to 15 degrees higher than the highest boiling hydrocarbon extracted and which is incapable of forming an azeotrope with such extracted hydrocarbons.

It is to be pointed out that when working with raw primary oil, at least a portion of the chemicals present are solubilized by the salt or soap formed in the neutralization step and pass into that phase. This is true regardless of whether or not partial or complete neutralization is employed and the quantity of chemicals so solubilized is generally dependent upon the concentration of the salt or soap phase formed by the addition of caustic.

In employing the modification of my invention involving substantially complete neutralization of the primary oil, I have found that in order to secure optimum results the caustic solution should be added, preferably with agitation, until the resulting mixture has reach a pH of about at least 10. I have found it preferable to bring the pH of mixture up to a value of at least 10 in order to effect substantially complete neutralization of all of the acids present, especially those of higher molecular weight which tend to be converted less readily at a lower pH into their corresponding salts. On the other hand, where it is desired to effect only partial neutralization of the primary oil, I have found that the mixture should be brought to a pH not in excess of about 7; however, sufficient base should be added to effect the formation of separate soap and oil phases. In this connection, I wish to point out that oil-salt mixtures of the type herein contemplated are not neutral at a pH of 7 in the sense that all of the free acid present is converted to its corresponding salt. To completely neutralize all of the acid, it will be apparent that the stoichiometric quantity of base must be added and it is to be strictly understood that the expression "completely neutralized," as used in the present specification, is to be so interpreted. When neutralization of the acids is effected in this manner, the resulting solution will be basic and frequently will have a pH of 10 or higher owing to the fact that in the case of neutralization with strong bases, the salts formed tend to hydrolize to give a solution having a pronounced alkaline reaction. With pH values between about 7 and about 10 I have generally found that an interfacial or third layer forms which contains a substantial portion of iron together with oil and chemicals; and while it might be desirable to discard such a fraction from the standpoint of iron removal, it is not economical to do so, at least in the case of hydrocarbon synthesis primary oil, because of the very substantial quantity of chemicals together with a smaller amount of hydrocarbons present in this layer. If desired, however, this intermediate layer can be withdrawn and the chemicals and hydrocarbons removed from the iron by distilling such fraction in the presence of water. In purifying other types of oils an interfacial layer may be formed, if desired, to effect removal of the iron without encountering the major difficulties presented in the case of raw primary synthesis oil.

The temperature employed in effecting complete or partial neutralization of the acid component in the oil may, in general, be carried out over a relative wide range. Ordinarily, however, I prefer to effect this operation at temperatures in the range of 20° to 40° C.

Figure 2:
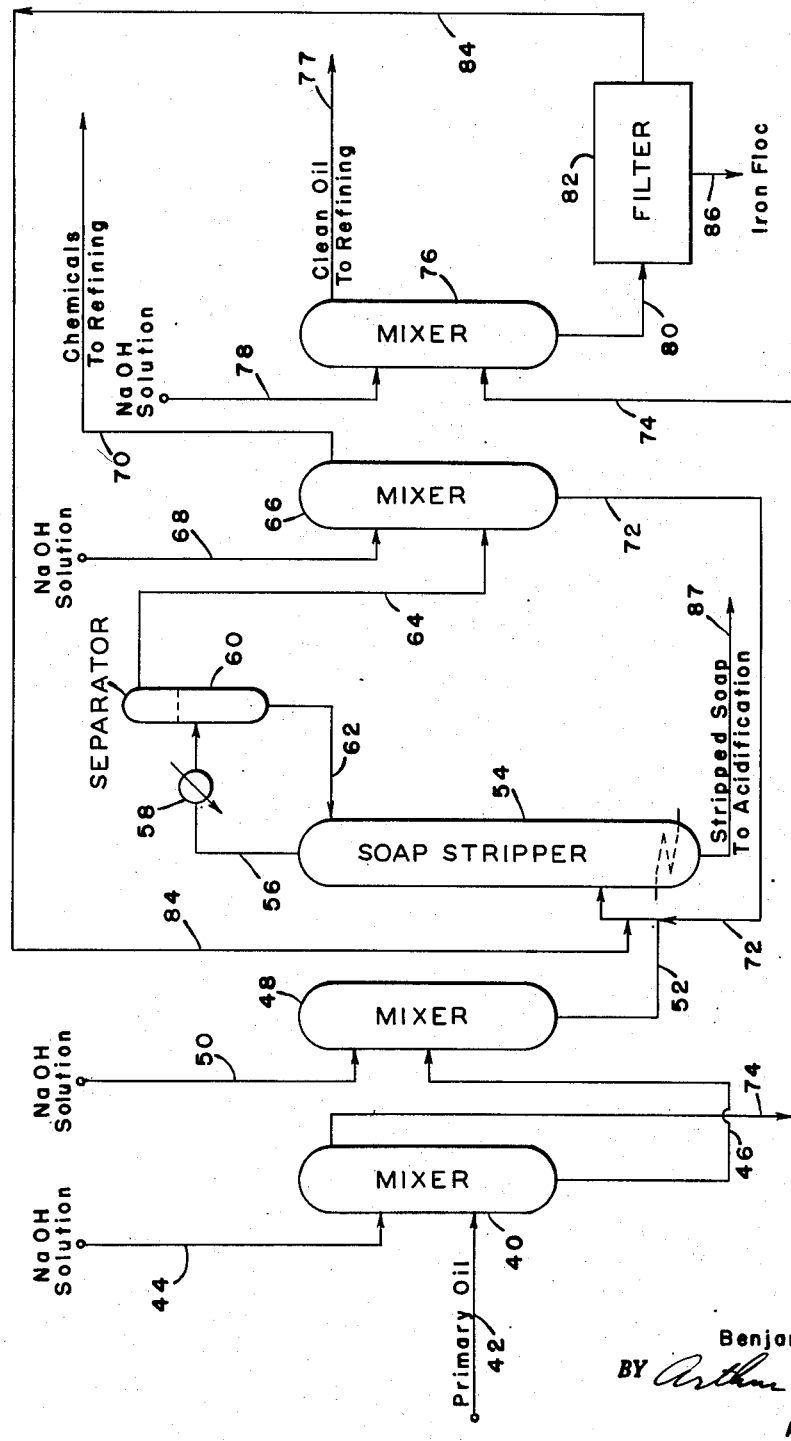

The process of my invention may be further illustrated by reference to the accompanying drawings in which Fig. 1 represents a flow diagram embodying complete neutralization of the primary oil followed by recovery of the acids and other chemicals, while Fig. 2 is a diagrammatical representation of another embodiment of my invention in which the primary oil is incompletely neutralized in the initial step. Fig. 3 is a diagrammatical representation of a third embodiment of my invention involving a method for removing metal contaminants as well as acid revertable polymers, if present, by means of selective extraction.

In the process illustrated in Fig. 1 raw primary oil containing approximately 1 weight per cent of dissolved iron from a hydrocarbon synthesis operation employing a fluidized iron catalyst is introduced into mixer 2 through line 4. Sufficient sodium hydroxide in the form of a 10 to 25 per cent solution is thereafter introduced into mixer 2 through line 6, with agitation, to bring the pH of the resulting mixture to a value of about 10. Thereafter, the mixture is allowed to stratify into two layers. The neutral iron-free oil layer is withdrawn through line 8 and sent to a further refining operation, if desired. The soap phase containing iron as a floc is withdrawn through line 10 and introduced into filter 12 where the iron is retained on the filtering medium and periodically withdrawn through line 14. The iron-free soap filtrate thus obtained is withdrawn through line 16 and sent to stripper 18 where solubilized chemicals and hydrocarbons are withdrawn through line 20 and condenser 22 and thereafter conducted to separator 24 where the distillate is allowed to separate into two layers. The lower water layer is withdrawn from separator 24 through line 26 and returned to stripper 18, while the oil layer, consisting essentially of chemicals together with a small percentage of hydrocarbons, is withdrawn through line 28 and introduced into mixer 30. It is generally found necessary to add more caustic at this point through line 32 into mixer 30 inasmuch as some free acid is generated during the soap stripping operation. The resulting neutralized mixture is allowed to separate into an oil and water phase, and the latter which contains some soap together with a relatively small quantity of solubilized chemicals is recycled through line 34, combined with the filtrate in line 16 and sent to stripper 18. The oil phase in mixer 30 which consists essentially of oil soluble chemicals is withdrawn through line 36 and sent to a suitable chemical recovery system or to a suitable isomerization unit and converted into gasoline. The soap fraction from which chemicals have been removed in stripper 18 is withdrawn from the latter through line 38 and sent to an acidification unit (not shown) and thereafter the acids thus liberated may be separately recovered.

In the process illustrated in Fig. 2 raw primary synthesis oil, containing approximately 1.25 weight per cent of dissolved iron, is introduced into mixer 40 through line 42. Sodium hydroxide in the form of a 10 to 25 per cent solution is thereafter introduced through line 44, with agitation, in an amount sufficient to bring the pH of the soap layer thus formed to a value of approximately 7. The resulting mixture is then allowed to stratify into two layers after which the partially neutralized soap phase is withdrawn therefrom through line 46 and introduced into mixer 48 where the pH of the soap solution is increased to a value of at least 10 by adding a 10 to 25 per cent sodium hydroxide solution through line 50, in the presence of agitation. The resulting iron-free soap phase is then withdrawn from mixer 48 through line 52 and introduced into stripper 54 where chemicals dissolved therein are withdrawn overhead through line 56 and condenser 58 and thereafter conducted to separator 60 where the distillate is allowed to separate into two layers. The lower water layer is withdrawn from separator 60 through line 62 and returned to stripper 54 while the oil layer, consisting essentially of chemicals, is withdrawn through line 64 and introduced into mixer 66 where the relatively small quantity of acids liberated in the soap stripping operation are again neutralized by adding thereto, with agitation, a 10 to 25 per cent solution of sodium hydroxide through line 68. Thereafter the resulting mixture is allowed to form two layers and the upper layer, containing chemicals, is withdrawn through line 70 where this fraction may, if desired, be further refined. The lower layer, containing a dilute soap solution together with a small quantity of chemicals dissolved therein, is withdrawn through line 72, combined with the neutralized soap phase in line 52 and sent to stripper 54. The oil layer, containing dissolved iron, is withdrawn from mixer 40 through line 74 and introduced into mixer 76 where a sufficient quantity of a sodium hydroxide solution is added through line 78, in the presence of agitation, to bring the pH of the resulting mixture to a value of about 10. Treatment of the oil phase in this manner results in forcing the dissolved iron contained therein into the aqueous soap layer thus formed. After allowing the mixture to separate into an iron-free neutral oil layer and an aqueous soap layer, the clean oil is withdrawn from mixer 76 through line 77 and sent to the refinery. The aqueous soap phase is withdrawn from mixer 76 through line 80 and introduced into filter 82 where the iron, which has been converted into insoluble ferric hydroxide, is removed and the filtrate thus obtained, consisting essentially of a dilute aqueous solution of fatty acid soaps together with a small quantity of chemicals, is recycled through line 84 to stripper 54 where further separation of the chemicals from the soap phase may be effected. Periodically, iron floc together with the filter aid employed in filter 82 are withdrawn through line 86, and the spent filter aid replenished with fresh filtering material. The soap fraction from which chemicals have been removed in stripper 54 is withdrawn from the latter through line 87, sent to an acidification unit (not shown) and thereafter the acids thus liberated may be separately recovered by careful fractional distillation.

Referring to Fig. 3, raw primary synthesis oil containing approximately 1.25 weight per cent of dissolved iron is introduced into mixer 88 through line 90. Sodium hydroxide in the form of a 10 to 25 per cent solution is thereafter introduced through line 92, with agitation, in an amount sufficient to completely neutralize the free acids present in the primary oil. The pH of the resulting mixture is generally in the neighborhood of about 10. This mixture is then allowed to stratify into two layers after which the iron-free oil is withdrawn through line 94 and sent to further refining while the soap phase is withdrawn through line 96 and introduced into mixer 98 where the pH of the soap solution is reduced to a value of about 7 by the addition of a dilute (10 to 15 per cent) mineral acid such as hydrochloric or sulfuric acids through line 100. By thus adjusting the pH of the soap phase, the iron present therein is rendered oil soluble and is removed from said phase by contacting the latter with a suitable hydrocarbon solvent such as, for example, octane, which is introduced through line 102. Also, during this extraction step, aldehyde polymers produced in mixer 88 are removed from the soap along with the iron. On allowing the mixture to form two layers, the upper hydrocarbon layer is withdrawn through line 104 and sent to hydrocarbon stripper 106 where light hydrocarbons, extracted by the soap phase from the primary oil in mixer 88, are separated from said phase and removed as an overhead fraction through condenser 108 and line 110, a portion being returned to stripper 106 as reflux through line 112. The major portion of the hydrocarbon solvent employed is withdrawn from stripper 106 through condenser 105 and line 107 and combined with make-up solvent in line 102. This overhead fraction of light hydrocarbons in line 110 is combined with the clean iron-free oil withdrawn from mixer 88 and sent to the refinery. A residue of aldehyde polymer, iron, and a small quantity of hydrocarbon is periodically withdrawn from stripper 106 through line 114. The soap layer from mixer 98 is withdrawn through line 116 and introduced into mixer 118 where it is neutralized by the addition of sodium hydroxide in the form of a 10 to 25 per cent solution through line 120. The completely neutralized soap solution thus obtained is then withdrawn through line 122 and introduced into soap stripper 124 where chemicals dissolved in the soap are removed overhead through line 126 and condenser 128 and thereafter conducted to separator 130 where the distillate is allowed to separate into two layers. The clean soap phase thus obtained is withdrawn from stripper 124 through line 125, sent to an acidification unit (not shown) and thereafter the acids thus liberated separately recovered by careful fractional distillation. The lower water layer is withdrawn from separator 130 through line 132 and returned to stripper 124 while the oil layer, consisting essentially of chemicals, is withdrawn through line 134 and introduced into mixer 136 where the relatively small quantity of acids liberated in the soap stripping operation are again neutralized by adding thereto, with agitation, a solution of sodium hydroxide through line 138. Thereafter the resulting mixture is allowed to form two layers and the upper layer containing chemicals is withdrawn through line 140 where this fraction may, if desired, be further refined. The lower layer containing a dilute soap solution together with a small quantity of chemicals dissolved therein is withdrawn through line 142, combined with the completely neutralized soap in line 122 and sent to stripper 124.

In the above-mentioned drawings reference to certain equipment such as pumps, gages, valves, stirrers, and the like which obviously would be necessary to operate the process has been intentionally omitted. Only sufficient equipment has been diagrammatically shown to illustrate the process, and it is intended that no undue limitation be read into my invention by reference to the drawing and description thereof.

It is to be understood, of course, that the processes illustrated by the flow diagrams discussed above are merely preferred embodiments of my invention and are to be in no way considered as limiting the scope thereof. For example, other equivalent methods for separating ferric hydroxide or similar insoluble metal hydroxides, appearing as contaminants in the oil thus treated, from the soap phase may be employed and any of the known procedures for recovering fatty acids from said soap phase may be utilized. Although my process is especially adapted for the treatment of raw primary hydrocarbon synthesis oil, as illustrated above, it is also applicable to the purification of any oil from which it is desired to remove iron or similar undesirable impurities. Thus, for example, my process may be employed in the purification of acidic mineral or vegetable oils containing dissolved metal contaminants of the aforesaid type. Moreover, while I have generally indicated in the foregoing description that the acid component of the oils treated in accordance with my invention consists of the acids found in raw primary hydrocarbon synthesis oil, the source of the acid component is unimportant, i. e., it may consist of another organic acid or acids not produced in hydrocarbon synthesis or it may be a mineral acid such as, for example, phosphoric acid, sulfuric acid, etc. In other words, whether a "soap" or a "salt" (these terms are to be interpreted in their ordinary sense) is produced by the neutralization step, my process may be employed for the purpose of removing dissolved iron or similar impurities from the oil.

It should be further understood that my process may be utilized in conjunction with other procedures for treating oils of the type herein contemplated, or for separating other components from such oils. Although I have only specifically mentioned sodium hydroxide as a suitable neutralizing agent in carrying out my process, it will be readily apparent that any water soluble base may be employed; for example, I may use other basic materials including sodium carbonate, ammonium hydroxide, potassium or ammonium carbonates, or other alkali metal hydroxides such as lithium hydroxide, potassium hydroxide, and the like. In this connection, the expression "basic derivatives" appearing in the present description and certain of the appended claims is to be construed as referring to the oil insoluble product formed by reaction of a base of the above-mentioned type with the metal contaminant in the oil or to those contaminants precipitatable by alkaline solutions.

What I claim is:

1. In a process for the purification of raw primary hydrocarbon synthesis oil contaminated with a metal which is in at least a partially dissolved state and the basic derivatives of which are substantially insoluble in said oil, the steps which comprise bringing the pH of said primary oil to a value of at least about 10, separating the remaining neutralized oil phase from the resulting soap phase which contains the metal contaminant in the form of a flocculent precipitate, thereafter adding sufficient acid to said soap phase to lower the pH thereof to a value of about 7 thereby causing said precipitate to dissolve, extracting the resulting solution with a selective solvent for said dissolved contaminant, and withdrawing said soap phase free from said contaminant.

2. A process for refining primary oil produced in a synthesis operation wherein carbon monoxide and hydrogen are contacted with a promoted iron catalyst under synthesis conditions, said oil consisting essentially of hydrocarbons and oxygen-containing organic chemicals including organic acids and also containing a substantial amount of iron contaminant, which comprises intimately mixing said primary oil with an aqueous alkaline solution in amounts sufficient to obtain complete neutralization of the organic acids and to result in a mixture having a pH of at least about 10, separating the remaining oil phase from the resulting aqueous soap phase which contains iron in the form of a flocculent precipitate, together with nonacid oxygenated chemicals, adding to said soap phase sufficient acid to dissolve said iron contaminant, thereafter removing said contaminant from the soap by contacting the latter with a selective solvent for said contaminant, and removing the resulting extract leaving a soap free of said contaminant.

3. In a process for the purification of a hydrocarbon solution of oxygenated organic compounds including organic acids and containing a contaminant precipitatable by excess alkalinity, the steps which comprise intimately mixing said hydrocarbon solution with an aqueous alkaline solution in amounts sufficient to obtain complete neutralization of the organic acids therein and to result in a mixture having a pH of at least about 10, separating the remaining oil phase from the resulting aqueous soap phase which contains said contaminant in the form of a flocculent precipitate together with nonacid oxygenated organic chemicals, adding to said soap phase sufficient acid to dissolve said contaminant, thereafter removing said contaminant from the soap by contacting the latter with a selective solvent for said contaminant, and removing the resulting extract leaving a soap free of said contaminant.

4. In a process for the purification of a soap solution having an acid revertable polymer dissolved therein, the steps which comprise adding to said soap sufficient acid to liberate a portion of the acid component of the soap, thereafter removing said polymer from said soap by contacting the latter with a selective solvent for the polymer, removing the resulting extract and leaving a polymer-free soap.

5. In a process for the purification of a soap containing a metal contaminant, the basic derivatives of which are substantially insoluble therein, the steps which comprise adding to said soap sufficient acid to dissolve said metal contaminant, thereafter removing said contaminant from the soap by contacting the latter with a selective solvent for the contaminant, removing the resulting extract and leaving a contaminant-free soap.

BENJAMIN S. PACE.

References Cited in the file of this patent
UNITED STATES PATENTS

| Number | Name | Date |
|---|---|---|
| 1,833,331 | Park | Nov. 24, 1931 |
| 2,434,537 | Barr et al. | Jan. 13, 1948 |
| 2,452,121 | Grahame | Oct. 26, 1948 |
| 2,472,837 | King | June 14, 1949 |
| 2,494,371 | Wadley | Jan. 10, 1950 |
| 2,516,126 | Lauer et al. | July 25, 1950 |
| 2,540,129 | Lauer et al. | Feb. 6, 1951 |
| 2,568,517 | Sharp et al. | Sept. 18, 1951 |